United States Patent [19]
Collins

[11] Patent Number: 4,697,343
[45] Date of Patent: Oct. 6, 1987

[54] DEVICE FOR CUTTING SHIELDED CABLE
[75] Inventor: Scott J. Collins, Milwaukee, Wis.
[73] Assignee: William E. Gardner, Slinger, Wis.
[21] Appl. No.: 887,199
[22] Filed: Jul. 21, 1986
[51] Int. Cl.⁴ .............................................. B21F 13/00
[52] U.S. Cl. ....................................... 30/90.3; 30/90.4
[58] Field of Search .................... 30/90.1, 90.2, 90.4, 30/90.6, 90.7, 90.8, 90.9, 91.1, 91.2; 269/231, 235

[56] References Cited
U.S. PATENT DOCUMENTS

| | | | |
|---|---|---|---|
| 1,198,365 | 9/1916 | Manney | 269/231 X |
| 2,374,871 | 5/1945 | Loveman | 269/231 X |
| 2,654,941 | 10/1953 | Schleimer | |
| 2,674,027 | 4/1954 | Kosinski | |
| 3,453,917 | 7/1969 | Perry | |
| 3,633,275 | 1/1972 | Hutchinson | 30/90.3 |
| 3,851,387 | 12/1974 | Ducret | 30/90.3 |
| 4,142,290 | 3/1979 | Ducret | 30/90.3 X |
| 4,359,819 | 11/1982 | Ducret | 30/90.3 |

Primary Examiner—Donald R. Schran
Assistant Examiner—Michael D. Folkerts
Attorney, Agent, or Firm—James E. Nilles

[57] ABSTRACT

In a device for cutting shielding of shielded cable, comprising an elongated cable carrier of U-shaped cross-section and an elongated saw carrier hinged to the cable carrier, cable is releasably locked into a lengthwise extending, sidewardly opening groove in the cable carrier by means of a lever pivoted to it and having plural lobes that project radially from the axis about which the lever swings, the lobes having rounded tip portions at different distances from that axis. As the lever is swung in a locking direction one of the lobes, depending upon cable diameter, cammingly engages a cable in the groove defined by the cable carrier and locks it to the cable carrier for cutting.

4 Claims, 5 Drawing Figures

U.S. Patent  Oct. 6, 1987  4,697,343
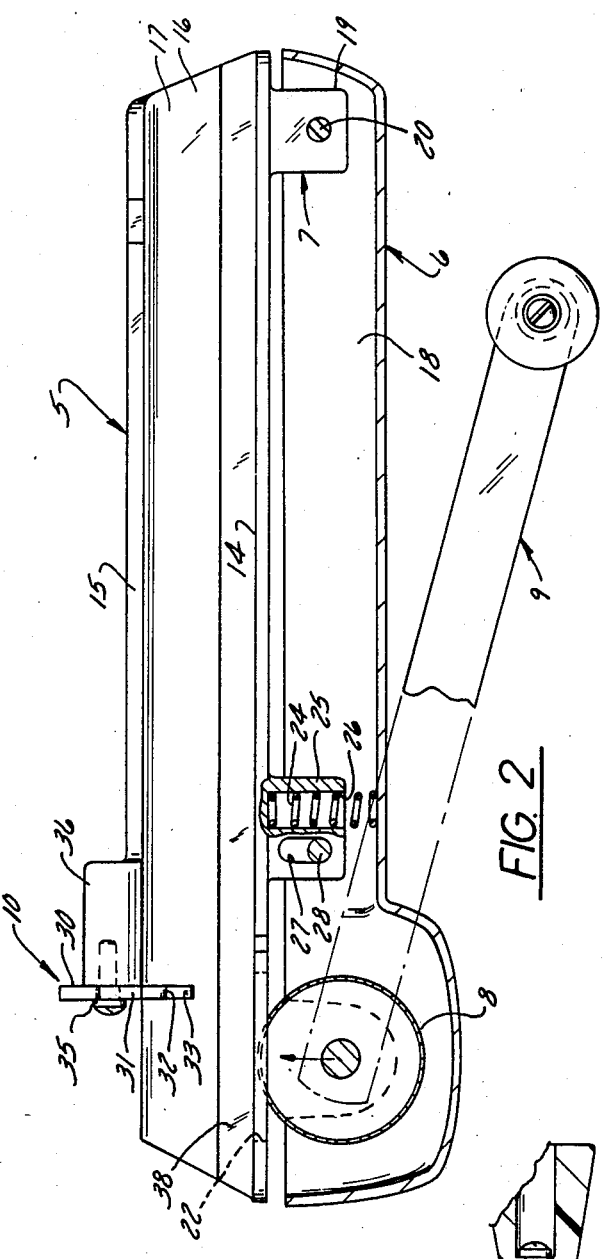
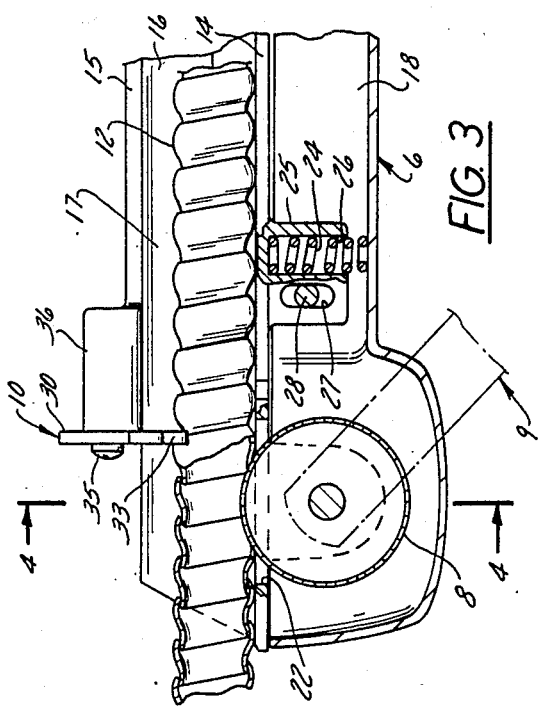
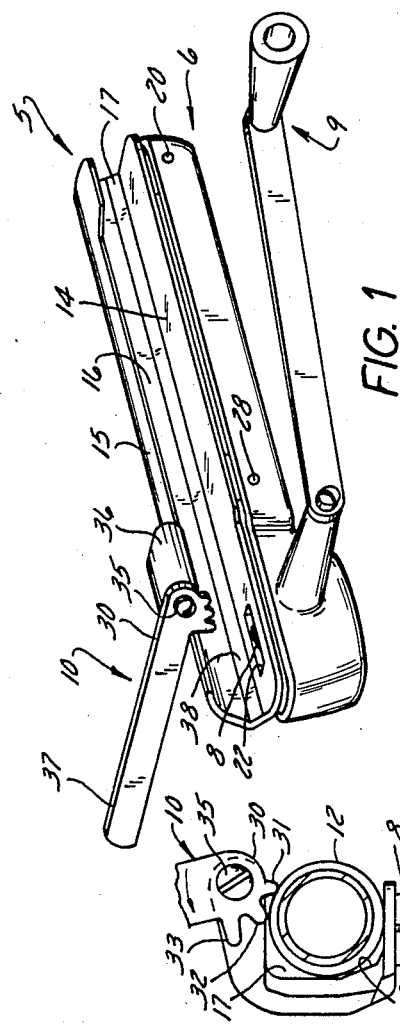
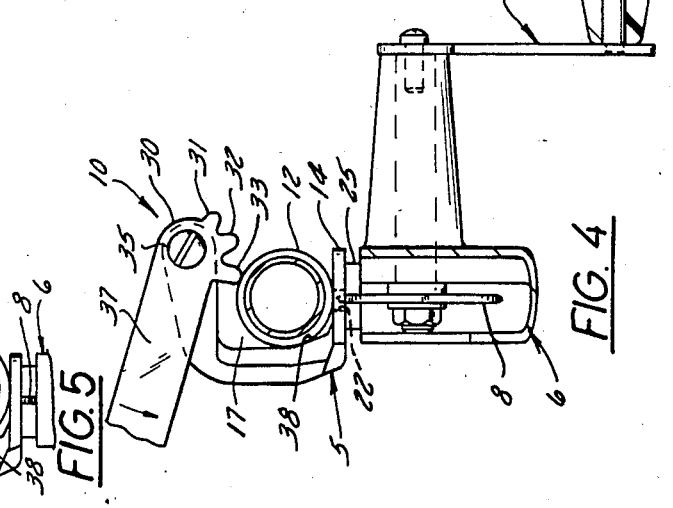

DEVICE FOR CUTTING SHIELDED CABLE

FIELD OF THE INVENTION

This invention relates to devices for cutting the helically wound metal shielding of shielded cable and is more particularly concerned with an improved cutter for such material which adapts itself automatically to shielded cable of the particular diameter to be cut and with which securement and release of the cable can be accomplished by simple operations that are performed in an instant.

BACKGROUND OF THE PRIOR ART

Shielded cable, also known as armored cable and BX, consists of a spirally wound strip of metal that provides a relatively flexible duct in which conductor wires are protectively enclosed. For cutting such material to desired length, a saw cut must be made through the spirally wound strip, in a direction substantially lengthwise of the cable and having a length at least equal to the width of the spirally wound strip.

Although a hack saw is a commonly used tool for cutting shielded cable, it is not well suited for the purpose because the cable must be rather sharply flexed at the cutting zone and the hack saw blade must be applied to a surface on the cable that curves away from the blade edge in all directions and thus encourages the saw to slip off of the cable and possibly injure the person performing the operation. In addition, the depth of a cut through the shielding should be carefully controlled to avoid damage to insulation on the conductors inside it, but there is no reliable way to gage the depth to which a hack saw blade has penetrated the shielding.

With these considerations in mind, a number of devices for cutting shielded cable have heretofore been proposed, intended to afford safety both for the user and for the insulation on the conductors. Most such devices have comprised a circular saw blade that was rotated by means of a hand crank or the like, cooperating with a cable supporting means whereby the shielded cable was secured in such relation to the saw blade that the latter could penetrate the shielding to only a limited depth.

U.S. Pat. No. 2,654,941 discloses such a device wherein the cable supporting means comprises two elongated lengthwise spaced apart cradle sections, one to underlie the cable and support it, the other to overlie the cable and steady it. The cable is maneuvered between the two cradle sections and then swung into engagement with them. Under some conditions a shielded cable could probably be attached to this device, cut and removed from it with commendable speed and facility. However, the cable is not positively clamped to the device, and the flexing of a free length of shielded cable is difficult to control, so that there are situations in which the cable would control the position and orientation of the cutting device, rather than being controlled by it, and the cutting operation would therefore be awkward. A further and very important disadvantage of this device is that it can be used with shielded cable of only one diameter.

U.S. Pat. No. 2,674,027 discloses a device wherein the shielded cable to be cut must be slid lengthwise in an elongated substantially tubular holder to bring it to a position at which a cut is to be made in it, and the cable is clamped at that position by means of a thumb screw threaded into the holder transversely to its length. The device is obviously inconvenient to use when a cut must be made at a location some distance from each end of a long piece of cable.

U.S. Pat. No. 3,851,387 discloses a device having an elongated cable holder in the form of a trough that is open at one side, for lateral insertion of the cable to be cut, and the cable is again clamped in place by means of a thumb screw threaded into the holder. The disadvantage of this arrangement is that the thumb screw must be tightened into secure clamping relationship with the cable for a cutting operation and loosened after that operation is performed. Tightening and loosening of the thumb screw take time and require a certain amount of strength.

U.S. Pat. No. 3,633,275 discloses a device wherein the cable holder has hinged clamping jaws which require the operator to exert manual clamping force upon the cable with one hand while attending to actuation of the rotary cutting blade with the other hand. While securement and release of the cable can be effected rather quickly with this arrangement, the security with which the cable is locked to the device is dependent upon the strength of the operator's one hand. Use of this device can therefore be fatiguing, especially where several cuts must be made in rather rapid succession. Furthermore, the clamping holder is inherently suited only for larger diameter shielded cables; to adapt it for smaller diameter cables a small spacer must be fastened to one of the clamping jaws by means of a thumb screw. Installation of such a spacer is in itself time consuming and inconvenient, and because it is a relatively small part it can be easily lost or misplaced. Another important disadvantage of this device is that the saw blade is biased towards the cable by means of a spring that exerts a predetermined force which the user cannot vary during the course of a cut and which may be too great under some circumstances and too small at other times.

U.S. Pat. No. 3,453,917 discloses a device which is intended to be mounted on a workbench or the like and which therefore presents the inconvenience that, for every cut, the cable must be moved to the workbench or the workbench moved to the cable. The cable is clamped to the device by means of a thumb screw, so that securement and release of the cable are not convenient operations.

As correctly pointed out in some of the above-discussed patents, a cable cutter of the type here under consideration is essentially a safety device intended to protect the user against the hazards inherent in using a hack saw. Since a hack saw is almost invariably available to a person who has occasion to cut shielded cable, the cost of a cable cutter must be low enough not to discourage its purchase as a supplement to the hack saw. Furthermore, a hack saw can be brought into action on a piece of shielded cable practically instantaneously. Therefore, the problem is not just to provide a cable cutter that is low in cost, functionally satisfactory and reasonably convenient in use, but to provide a cable cutter which offers the user so much speed and convenience that he has no incentive to use the hack saw instead. Apparently this real problem has not heretofore been recognized, or else those skilled in the art have heretofore been unable to solve it; but in either case, as is apparent from the foregoing review of the prior art, it has not heretofore been obvious how to provide a shielded cable cutter that not only satisfies the obvious need for low cost, sturdiness and safety but also affords no less convenience and speed than a hack saw seems to offer.

SUMMARY OF THE INVENTION

The general object of this invention is to provide a device for cutting through the shielding on shielded cable, featuring cable securement means which automatically adjusts itself to cable of the particular diameter to be cut, without need for installing an adapter, and which is so arranged that shielded cable can be instantly locked to the device or released from it with one quick, easily performed motion.

A more specific object of the invention is to provide a simple and inexpensive cable shielding cutter having cable securement means comprising a clamping lever that is merely swung in one direction to lock a cable to the device for cutting and is swung in the opposite direction to release the cable, so that securement and release of the cable can be accomplished with the utmost speed and convenience, even by a person wearing heavy gloves.

It is also an object of this invention to provide a versatile cable shielding cutter which adapts itself automatically to cable of the particular diameter to be cut, without the need for an adapter which must be installed or removed to accommodate cable of different sizes and which can be easily lost or misplaced.

Another specific object of the invention is to provide a shielded cable cutter of the type that comprises a pair of elongated hingedly connected handles, one of which comprises a carrier for a saw blade and the other of which comprises a cable carrier to which shielded cable can be very quickly locked, said handles being so arranged that they can be held in one hand of the user and squeezed toward one another to provide whatever force is considered desirable for engaging the saw blade against the cable shielding while the other hand is used to actuate the saw blade.

Thus the ultimate object of the present invention is to provide a cutter for shielded cable which affords safety for the user and for insulation on the conductors of shielded cable to be cut and which is so inexpensive and easy to use as to leave no reason or encouragement for the use of a hack saw.

In general, these and other objects of the invention that will appear as the description proceeds are achieved in an improved device for cutting the shielding of shielded cable, which device comprises an elongated cable carrier having a U-shaped cross-section defined by a pair of opposite side walls connected by a transverse wall and providing a groove that extends along the length of the cable carrier and into which a shielded cable can be laterally inserted, an elongated saw carrier connected with said cable carrier to extend lengthwise along one of said side walls thereof and to be laterally movable in opposite directions towards and from the cable carrier, and a saw blade having an arcuate cutting edge mounted on the saw carrier for edgewise movement relative to it and for movement with it in said directions whereby said cutting edge is carried into and out of said groove through a slit in said one side wall of the cable carrier. The improvement of this invention resides in locking means whereby shielded cable can be readily releasably confined in said groove and immobilized relative to the cable carrier for cutting by the saw blade. That locking means comprises a lever pivoted to the cable carrier to swing about a lever axis which extends substantially parallel to the length of the cable carrier, is laterally spaced from said one side wall and said transverse wall, and is near the other one of said side walls, and a plurality of cable engaging lobes fixed on said lever. Each of the cable engaging lobes projects substantially radially in relation to the lever axis and has a tip portion which is rounded about an axis of curvature that lies within the lobe and is parallel to the lever axis. The lobes are spaced apart angularly around the lever axis and are disposed in a single plane which is normal to the lever axis and transversely intersects the slit. The lobes have their tip portions at distances from the lever axis which increase progressively from lobe to lobe in one direction around the lever axis so that when the lobes are carried in that direction by swinging of the lever one of them will cammingly engage a shielded cable in said groove and force it against said one side wall and said transverse wall.

BRIEF DESCRIPTION OF THE DRAWINGS

In the accompanying drawings, which illustrate what is now regarded as a preferred embodiment of the invention:

FIG. 1 is a perspective view of the cutting device of this invention;

FIG. 2 shows the cutting device partly in side elevation and partly in longitudinal section;

FIG. 3 is a fragmentary view generally similar to FIG. 2 but showing the device in operative association with a shielded cable being cut;

FIG. 4 is a sectional view taken on the plane of the line 4—4 in FIG. 3; and

FIG. 5 is a fragmentary view generally similar to FIG. 4 but showing the device in use with a shielded cable of larger diameter than that shown in FIG. 4.

DETAILED DESCRIPTION OF PREFERRED EMBODIMENT OF THE INVENTION

The cutting device of this invention comprises, in general, an elongated cable carrier 5, an elongated saw carrier 6, a hinge connection 7 between the two carriers, near their rear ends, a saw blade 8 that is mounted on the saw carrier near its front end, and a manual actuator 9 for moving the saw blade edgewise relative to the saw carrier. The hinge connection 7 disposes the two carriers 5, 6 in side-by-side relationship and allows them to swing through a limited distance towards and from one another. With the novel cable locking means 10 of this invention, which is mounted on the cable carrier 5 and is described hereinafter, shielded cable 12 to be cut is releasably locked to the cable carrier 5 and immobilized relative to it. The saw blade 8 can then be moved edgewise relative to the saw carrier by means of the actuator 9, and at the same time the saw blade is advanced into the shielding of the cable by swinging the carriers 5 and 6 towards one another about the hinge connection 7 between them. For this operation the two carriers 5 and 6, which constitute handle members, are held in one hand and squeezed towards one another while the saw blade actuator 9 is operated with the other hand. The squeezing force that the user applies to the carriers 5, 6 determines the force under which the saw blade 8 edgewise engages the cable shielding and tends to be regulated by the force found necessary to actuate the saw blade.

For clarity of illustration the cutting device is here shown upside down in relation to the attitude in which it will usually be held by the user.

The cable carrier 5 is of substantially U-shaped cross-section along most of its length, having a pair of opposite side walls 14, 15 that are connected by a transverse wall 16. The walls 14, 15, 16 cooperate to define a groove 17 which extends along the length of the cable carrier and which opens to one side of the plane of the saw blade 8 as well as to both ends of the cable carrier. The width of this groove as measured between the side walls 14, 15 is great enough so that shielded cable of the largest diameter to be cut can be inserted laterally into it.

The saw blade carrier 6, which overlies the side wall 14 of the cable carrier, is also of U-shaped cross-section along most of its length, but its ends are closed so that it is hollow and defines a cavity 18 which opens towards the cable carrier. Near the rear end of the cable carrier is a lug 19 that projects from its side wall 14 into the cavity in the saw blade carrier, and a pin 20, extending through that lug and the opposite walls of the saw blade carrier, provides the hinge connection 7 between the two carriers 5, 6.

The saw blade 8, which is mounted on the saw blade carrier near its front end, has an arcuate cutting edge that is concentric to an axis which is parallel to the hinge axis defined by the pin 20. In this case the saw blade 8 is illustrated as a full circular disc, and the manual actuator 9 for it is shown as a crank by which it can be rotated, but it will be understood that the saw blade could be quadrant-shaped, for example, and could be edgewise manually reciprocated by means of a lever or the like. In any case, the cutting edge of the saw blade projects out of the cavity 18 in the saw blade carrier and through a slit 22 in the side wall 14 of the cable carrier, near the front end of the latter, to enter the groove 17 of the cable carrier for engagement against the shielding of a cable 12 confined therein. The carriers 5, 6 can be swung towards one another to a limit at which the front end of the saw carrier 6 abuts against the side wall 14 of the cable carrier, and at that limit the saw blade projects edgewise a predetermined distance beyond the inner surface of that side wall 14; hence the saw blade can penetrate only to a predetermined depth through the shielding of a cable 12 received in the groove 17 and confined against that side wall 14.

The carriers 5 and 6 are biased apart by means of a coiled expansion spring 24 which reacts between them. To accommodate it, the cable carrier 5 has a second lug 25 that projects into the cavity 18 in the saw blade carrier, between the hinge connection 7 and the saw blade 8 but nearer the latter, and this lug 25 has a well 26 therein that receives the spring 24. A limit of divergent motion of the handles 5, 6 relative to one another is defined by a slot 27 through the lug 25 which is elongated in the direction of swinging motion of the carriers and through which there extends an abutment pin 28 that has its opposite ends secured to the saw blade carrier. At the outer limit of divergent motion of the carriers 5, 6, towards which they are biased by the spring 24 and which is defined by engagement of the abutment pin 28 against the outer end of its slot 27, the saw blade 8 is clear of the surface of the groove 18 in the cable carrier so that the blade does not interfere with insertion of a shielded cable laterally into that groove.

To accommodate the cable locking means 10 of this invention the side wall 15 of the cable carrier that is remote from the saw blade carrier terminates some distance short of the front end of the cable carrier, about opposite the mid-point in the length of the saw blade slit 22. The cable locking means 10 comprises a lever 30 which is pivoted to the cable carrier and on which a plurality of cable engaging lobes 31, 32, 33 are fixed. The lever 30 is pivoted on a shoulder bolt 35 that is threaded rearwardly into a boss 36 on the front end portion of the short side wall 15, and the lever overlies the flat front end of that boss. The shoulder bolt 35 defines a swinging axis for the lever that extends parallel to the length of the cable carrier and is spaced from both the side wall 14 and the transverse wall 16.

The lever 30 can be formed from a single piece of flat material, having a straight elongated handle portion 37 that swings edgewise about the shoulder bolt 35 and having its lobes 31, 32, 33 integral with that handle portion and thus disposed in a single plane which is normal to the swinging axis and which transversely intersects the saw blade slit 22. Each of the lobes projects substantially radially in relation to the swinging axis of the lever so that the lobes are spaced apart angularly about that axis. The tip portion of each lob is rounded more or less concentrically to an axis of curvature which lies within the lobe and is parallel to the axis about which the lever swings. The tips of the lobes are at distances from the lever axis which increase progressively from lobe to lobe in one direction around that axis, so that the tip of the lobe 31 is at the shortest distance from the lever axis and the tip of the lobe 33 is at the longest distance from that axis. Preferably the lobes project substantially transversely to the length of the handle portion 37 of the lever.

Swinging the lever 30 in a locking direction designated by the arrow in each of FIGS. 4 and 5 carries the lobes 31, 32, 33 successively towards engagement with a shielded cable 12 in the groove 17 in the cable carrier. Depending upon the diameter of the cable, the rounded tip of one of the lobes will cammingly engage the cable and force it into clamped engagement with both the side wall 14 and the transverse wall 16, thus confining the cable against lateral displacement relative to the cable carrier. At the same time, this lobe will bite into the cable shielding, slightly denting it under the high force which can be imposed through the relatively long handle portion of the lever and thus confining the cable against lengthwise displacement relative to the cable carrier. As shown in FIG. 4, a small diameter cable will be engaged and locked in place by the largest radius lobe 33; whereas a large diameter cable will be engaged by the smallest radius lobe 31, as shown in FIG. 5. Cables of intermediate diameter will be engaged by the middle lobe 32 or by that lobe and one of the other lobes 31 or 33, depending upon the diameter of the particular cable and the amount of locking force exerted upon the lever. Thus the locking means automatically accommodates itself to cable of the diameter to be cut, and a cable is instantly locked to the cable carrier by merely swinging the lever as far as it will go in the locking direction. Of course the cable is instantly released by swinging the lever oppositely to the locking direction.

Since the lever 30 swings about an axis which is spaced from both the slitted side wall 14 and the transverse wall 16 of the cable carrier, and each lobe 31, 32, 33, when engaged against a cable, projects from that axis towards the junction of those two walls, the lobe forces the cable into firm engagement with both of those walls. However, it is also desirable that the cable—whatever its diameter—should contact the side wall 14 substantially along the longitudinal centerline of the slit 22, so that the plane of the saw blade 8 will extend through the full diameter of the cable. To this end, the transverse wall 16, at least in the neighborhood of the slit 22, has an inner surface portion 38 that extends at an obtuse angle to the inner surface of the slitted side wall 14, from its junction with that side wall partway to its junction with the opposite side wall 15. As can be seen from FIG. 4, a small diameter cable engages this oblique surface portion 38 to be held centered in relation to the plane of the saw blade, whereas (FIG. 5) a large diameter cable engages a surface of the transverse wall that is at a greater distance from that plane, to be likewise held centered in relation to that plane.

The crank 9 by which the saw blade is rotatably driven is at the right-hand side of the cutting device as here shown, and the groove 17 in the cable carrier also opens to that side of the device. The lobes 31, 32, 33 project substantially transversely from the elongated handle portion 37 of the lever and are so oriented that the lever projects toward the left side of the device when lockingly engaged with a cable, so that the lever is completely out of the way of the crank 9.

From the foregoing description taken with the accompanying drawings, it will be apparent that this invention provides a very inexpensive compact and sturdy device for cutting the shielding of shielded cable, which device can be used with such convenience and facility that it leaves no reason or temptation for the use of a hack saw.

What is claimed as the invention is:

1. In a device for cutting the shielding of shielded cable, comprising an elongated cable carrier having a U-shaped cross-section defined by a pair of opposite side walls connected by a transverse wall and providing a groove that extends along the length of the cable carrier and into which a shielded cable can be laterally inserted, an elongated saw carrier connected with said cable carrier to extend lengthwise along one of said side walls thereof and to be laterally movable in opposite directions towards and from the cable carrier, and a saw blade having an arcuate cutting edge mounted on said saw carrier for edgewise movement relative thereto and for movement therewith in said opposite directions whereby said cutting edge is carried into and out of said groove through a slit in said one side wall of the cable carrier, locking means whereby shielded cable can be readily releasably confined in said groove and immobilized relative to the cable carrier for cutting by the saw blade, said locking means comprising:
   A. a lever pivoted to said cable carrier to swing about a lever axis which extends substantially parallel to the length of the cable carrier, is laterally spaced from said one side wall and said transverse wall and is near the other one of said side walls; and
   B. a plurality of cable engaging lobes fixed on said lever,
      (1) each said lobe projecting substantially radially in relation to said lever axis,
      (2) each said lobe having a tip portion which is rounded about an axis of curvature that lies within the lobe and is parallel to said lever axis;
      (3) said lobes being spaced apart angularly around the lever axis and being disposed in a single plane which is normal to the lever axis and transversely intersects said slit, and
      (4) said lobes having their tip portions at distances from the lever axis which increase progressively from lobe to lobe in one direction around the lever axis so that when the lobes are carried in that direction by swinging of the lever one of them will cammingly engage a shielded cable in said groove and force it into clamped engagement against said one side wall and said transverse wall.

2. The device of claim 1 wherein said saw blade is circular and wherein a crank for manually rotating the saw blade is mounted on the saw carrier and has a handle movable in an orbit at one side of the device, further characterized by:
   (1) said lever being elongated and pivoted near one of its ends, and
   (2) said lobes being fixed on the lever near said one end thereof and projecting from the lever axis substantially transversely to the length of the lever so that the lever is swung away from said orbit to carry the lobes in said one direction around the lever axis.

3. In a device for cutting the shielding of shielded cable, comprising an elongated cable carrier having a pair of opposite side walls that extend in substantially parallel planes and are connected by a transverse wall to define for the cable carrier a U-shaped cross-section that provides a groove which extends along its length and into which a shielded cable can be laterally inserted, an elongated saw carrier connected with said cable carrier to extend lengthwise along one of said side walls thereof and to be laterally movable towards and from the cable carrier, and a saw blade having an arcuate cutting edge mounted on said saw carrier for edgewise movement relative thereto and edgewise movement therewith towards and from the cable carrier whereby said cutting edge is carried into and out of said groove through a slit in said one side wall of the cable carrier, locking means whereby shielded cable can be readily releasably confined in said groove and immobilized relative to the cable carrier for cutting by the saw blade, said locking means comprising:
   A. a lever having
      (1) a lever axis,
      (2) an elongated handle portion which projects radially in one direction from said axis to be swingable about the same, and
      (3) a plurality of lobes rigidly connected with said handle portion to be constrained to move therewith,
         (a) each said lobe projecting substantially radially in another direction in relation to said axis,
         (b) said lobes being disposed in a single plane which is normal to said axis and being spaced apart angularly around that axis,
         (c) each said lobe having a tip portion which is rounded about an axis of curvature that lies within the lobe and is parallel to said lever axis, and
         (d) said lobes having their tip portions at distances from the lever axis which increase progressively from lobe to lobe in one direction about the lever axis; and
   B. pivot means on said cable carrier, supporting the lever thereon, confining the lever to swinging relative to the cable carrier about said lever axis and disposing the lever with said lever axis parallel to said parallel planes and at a location near the other side wall of the carrier such that as the lever is swung about the lever axis each lobe in turn is brought to a position in which it projects towards a medial portion of said slit so that one of the lobes can engage a shielded cable in said groove and cammingly force it into clamped engagement against the portion of said one side wall wherein the slit is formed.

4. The device of claim 3 wherein said pivot means disposes the lever with the lever axis substantially parallel to the length of the cable carrier and spaced a substantial distance from said transverse wall, and wherein said single plane that contains the lobes transversely intersects said slit intermediate the ends thereof.

* * * * *